United States Patent [19]
Batista

[11] 3,904,282
[45] Sept. 9, 1975

[54] SPECTACLE LENSES HAVING PEAKED EDGES

[76] Inventor: Craig S. Batista, 342 Leon Ave., Perth Amboy, N.J. 08861

[22] Filed: June 7, 1974

[21] Appl. No.: 477,462

Related U.S. Application Data

[63] Continuation of Ser. No. 296,873, Oct. 12, 1972, abandoned.

[52] U.S. Cl.............. 351/174; 351/154; 51/101 LG
[51] Int. Cl............................................. G02c 7/02
[58] Field of Search........ 351/174, 154; 51/101 LG, 51/284

[56] References Cited
UNITED STATES PATENTS

| | | | |
|---|---|---|---|
| 2,748,541 | 6/1956 | Connell | 351/174 X |
| 3,063,340 | 11/1962 | Dillon | 351/174 |
| 3,087,285 | 4/1963 | Lissac | 351/174 X |
| 3,738,064 | 6/1973 | Szyferblatt | 351/174 X |

FOREIGN PATENTS OR APPLICATIONS

| | | | |
|---|---|---|---|
| 1,258,916 | 3/1961 | France | 351/106 |

Primary Examiner—David H. Rubin
Attorney, Agent, or Firm—Sherman & Shalloway

[57] ABSTRACT

Spectacle lenses having peaked peripheral edges defined by concave, curved surfaces converging at a peak to be received in bevelled channels in spectacle frames and apparatus for grinding peaked edges on spectacle lenses including a grinding wheel having a peripheral grinding rim with a pair of convex, curved edging surfaces converging intermediate the edges of the rim.

9 Claims, 5 Drawing Figures

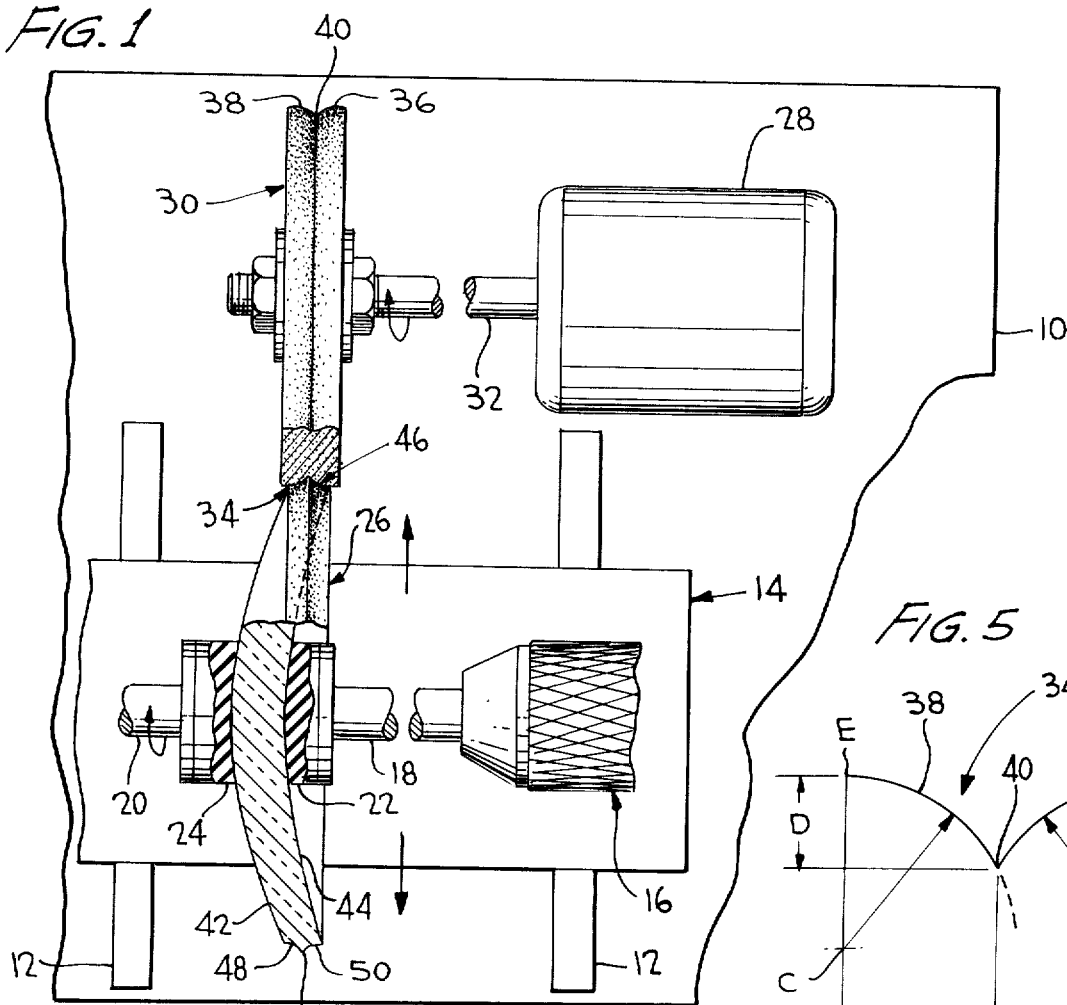

3,904,282

SPECTACLE LENSES HAVING PEAKED EDGES

This is a continuation of application Ser. No. 296,873 filed Oct. 12, 1972, now abandoned.

BACKGROUND OF THE INVENTION

1. Field of the invention

The present invention pertains to spectacle lenses and, more particularly, the spectacle lenses having peaked edges and apparatus for grinding such spectacle lenses.

2. Discussion of the Prior Art

Conventionally, spectacle lenses have bevelled edges formed around the periphery thereof to be received in bevelled channels in the rim of spectacle frames. In order to form such bevelled edges, the lenses are ground with a bevelling wheel which has inclined, rectilinear surfaces converging centrally of the rim of the wheel with a V-configuration thereby forming the edge of a ground lens with tapering, rectilinear, bevelled edges extending outwardly from a peak.

Where the grinding surface of the grinding wheel are symmetrically disposed, the resulting spectacle lens has the disadvantages of being unsightly and of having the ends of the bevelled edges protruding beyond the end of the rim of a spectacle frame. Where one of the grinding surfaces of the wheel is disposed at a standard front angle and the other grinding surface has a much flatter back angle, an improved lens is formed theoretically eliminating the protrusion of the end of the bevelled edge at the convex side of the lens; however, due to the flatter back angle the lens cannot be held securely in the rim of the spectacle frame. Where the grinding wheel has a standard front angle grinding surface and a shortened, standard back angle grinding surface, the resulting lens has an improved appearance at the concave surface of the lens but the end of the bevelled edge of the lens still protrudes from the end of the spectacle frame.

In order to overcome the above mentioned problems, grinding wheels have been formed with shortened grinding surfaces at standard front and back angles; however, while the lenses produced with such grinding wheels have been found successful in providing a secure, cosmetically appealing fit, grinding of the edges requires constant supervision by skilled personnel in order to precisely position the lens for grinding. That is, an external controlled positioning device must be utilized in conjunction with this type of grinding wheel, and such devices cannot be easily installed on existing grinding apparatuses and cannot be installed at all on some grinding apparatuses. Furthermore, such positioning devices do not function automatically; and, therefore, require the constant attention of a skilled technician. Thus, the use of this type of grinding wheel has the attendant disadvantages of requiring additional manpower and equipment and, accordingly, is inefficient from time, labor and monetary standpoints and is not well accepted.

SUMMARY OF THE INVENTION

Accordingly, it is a primary object of the present invention to overcome the above problems and disadvantages of the prior art in forming spectacle lenses.

Another object of the present invention is to provide spectacle lenses having peaked peripheral edges to be received in channels in the rim of a spectacle frame without the ends of the ground edges protruding beyond the end of the rim of the spectacle frame.

A further object of the present invention is to provide a grinding wheel for forming a peaked edge around a spectacle lens.

An additional object of the present invention is to provide apparatus for grinding a lens to provide an edge therearound with concave surfaces converging at a peak.

The present invention has another object in that a grinding wheel is formed with convex curved edging surfaces to grind concave curved surfaces on the periphery of a lens.

Yet an additional object of the present invention is to eliminate protrusion of the ends of ground edges of spectacle lenses from spectacle frames.

While the prior art has attempted to solve the problem of protruding ends of flat or rectilinear ground edges of spectacle frames by varying the angle of the flat edges or shortening the flat edges, it is a basic object of the present invention to overcome this problem by utilizing curved grinding surfaces to produce peaked edges without protruding ends independent of angle variation or variation in size of the ground edges.

A further object of the present invention is to configure the edge of a spectacle lens for self-centering in a channel in the rim of a spectacle frame by curving opposing surfaces of the edge toward a peak, the curved surfaces engaging edges of the channel to bias the spectacle frame toward the center of the channel.

Some of the advantages of the present invention over the prior art are that spectacles incorporating lenses according to the present invention have improved cosmetic qualities without additional expense, continuous supervision of edge grinding operations is not required, external control devices are not required for positioning the lens relative to the grinding wheel and the lenses are securely mounted in spectacle frames without protrusion of the ends of ground surfaces thereof beyond the ends of rims of the spectacle frames.

The present invention is generally characterized in a spectacle lens having a peaked edge defined by a pair of concave curved surfaces converging inwardly of the lens at a peak whereby the spectacle lens can be mounted in a spectacle frame with the peak received in a channel in the rim of the spectacle frame. The present invention is further generally characterized in a grinding wheel for edging lenses having a peripheral lens grinding rim including a pair of convex curved edging surfaces converging at a point centrally of the rim.

Other objects and advantages of the present invention will become apparent from the following description of the preferred embodiment taken in conjunction with the accompanying drawings.

BRIEF DESCRIPTION OF DRAWINGS

FIG. 1 is a broken plan view of apparatus for grinding spectacle lenses according to the present invention.

FIG. 2 is a broken cross-section of a frame for holding spectacle lenses.

FIG. 3 is a broken cross-section of a frame holding a spectacle lens according to the present invention.

FIG. 4 is a perspective view of a spectacle lens according to the present invention.

FIG. 5 is a broken side elevation of the grinding wheel of FIG. 1.

DESCRIPTION OF THE PREFERRED EMBODIMENT

Apparatus for grinding a peripheral peaked edge on a spectacle lens in accordance with the present invention is illustrated in FIG. 1 and includes a base 10 upon which are mounted a pair of rails 12. A carriage 14 is movable back and forth along rails 12 and carries a chuck assembly 16 for shafts 18 and 20 having rubber pads 22 and 24 at the ends thereof, respectively, for clamping a spectacle lens 26 to be ground. Any suitable means can be utilized along with the carriage and chuck assembly to position the spectacle lens for edging in accordance with the curvature and peripheral configuration of the lens.

A motor 28 is supported on base 10 to rotatably drive a grinding wheel 30 by means of a shaft 32. The grinding wheel rotates on an axis parallel to the central axis of the lens support; however, the support shafts for the grinding wheel and the lens can be disposed at any suitable angular displacement. The grinding wheel 30 has an annular, peripheral rim 34 disposed to make grinding contact with the peripheral edge of lens 26. Rim 34 includes a pair of convex, curved edging surfaces 36 and 38 converging at a point 40 between the outer ends of the peripheral rim. The point 40, at which the edging surfaces 36 and 38 intersect to form an annular valley around the grinding wheel 30, is preferably centered with respect to the outer ends of peripheral rim 34 such that edging surfaces 36 and 38 are symmetrical about 40; however, the point 40 of intersection of the edging surfaces can be displaced from center if desired.

Each of the edging surfaces 36 and 38 describes the arc of a circle which has a center C disposed in alignment with an end E of the edging surface along the side of the grinding wheel, as best illustrated in FIG. 5; and, since edging surfaces 36 and 38 have the same configuration, only edging surface 38 will be described in detail. The radius of curvature of edging surface 38 is greater than the lateral width W of the edging surface 38 such that a tangent at point 40 is oblique to the axis of rotation of the grinding wheel while a tangent at end E is parallel to the axis of rotation of the grinding wheel. The depth of curve D of edging surface 38 is, accordingly, less than the radius of curvature of the edging surface.

Since the edging surfaces 36 and 38 continuously curve inwardly to converge at point 50, no external control devices are required to position the lens 26 to be ground with respect to the peripheral rim 34 of the grinding wheel, and the spectacle lens, after grinding, will have a peaked peripheral edge with the peak defined by the converging of a pair of concave, curved surfaces.

The spectacle lens 26 ground in accordance with the present invention, as illustrated in FIGS. 1 and 4, includes a lens body having a convex face 42 opposite a concave face 44, the opposite faces 42 and 44 peripherally terminating at a ground peaked edge 46 defined by a pair of concave, curved surfaces 48 and 50 converging at a peak 52 intermediate ends 54 and 56 where surfaces 48 and 50 meet faces 42 and 44, respectively. The extent of curvature of surfaces 48 and 50 depends on the thickness of lens 26, with the angles between tangents at ends 54 and 56 and a line bisecting peak 52 approaching 90° as the thickness of the lens approaches the width of the peripheral rim 34 of the grinding wheel 30.

A conventional spectacle frame 58 for mounting the ground spectacle lens 26 is illustrated in FIG. 2 and includes a rim 60 having a bevelled channel 62 therein, the channel 62 being centered between sides of the rim to define flat shoulders 64 and 66 on opposite sides of the channel. Channel 62 has flat walls 68 and 70 extending from edges 72 and 74 of shoulders 64 and 66, respectively, in a V-configuration and terminating at an apex 76 such that the channel can receive the edge of a spectacle lens to be mounted on the spectacle frame.

The spectacle lens 26 according to the present invention is mounted on spectacle frame 58, as illustrated in FIG. 3, with peak 52 received in channel 62 out of contact with walls 68 and 70 or apex 76. The curved surfaces 48 and 50 of the peripheral rim 46 of the lens contact the support edges 72 and 74, respectively, of the rim of the spectacle frame, which edges are rounded by polishing. The contact of the curved surfaces 48 and 50 with the relieved edges of the rim of spectacle frame combined with the extension of peak 52 within the channel form an extremely stable fit for the spectacle lens, and the stability of the lens mounting is further increased by the biasing of the peaked edge toward the center of the channel due to the concave curvatures of surfaces 48 and 50.

Since the tangents at edges 54 and 56 approach a 90° angular displacement with respect to a line bisecting peak 52 and since the peak is centered in the channel 62, ends 54 and 56 are disposed close to shoulders 64 and 66, respectively, and protrude from the rim of the spectacle frame only slightly.

While the grinding wheel 30 of the present invention can be provided with varying dimensions and configurations as long as at least a portion of the grinding surfaces are curved, the embodiment of FIG. 5 is preferred due to the positioning advantages of utilizing continuously curving grinding surfaces. An example of a grinding wheel for edging standard lenses is as follows: radius of curvature of edging surfaces 36 and 38 is 9/32 inch; depth of curve D is 5/32 inch; width of curve W is ¼ inch; angle between tangents to the curved surfaces 36 and 38 at point 40 is 50°; and curved edging surfaces 36 and 38 are arcs of 65°. Best results are obtained with the angle between tangents of the converging point 40 within the range of from 25° to 75°, preferably within the range of from 45° to 55°, and with the arcs of curved edging surfaces 36 and 38 within the range of from 50° to 80°, preferably within the range of from 60° to 70°.

While the present invention has been described with respect to spectacle lenses, the present invention is applicable to any work having peaked edges for mounting. That is, the grinding wheel of the present invention may be utilized to grind peaked edges with converging curved surfaces on any object to be mounted by the edges, and the present invention encompasses various lenses to be mounted by the edges. It is noted, however, that the present invention is particularly advantageous and useful for spectacle lenses and solves problems long existing in the spectacle art.

Inasmuch as the present invention is subject to many variations, modifications and changes in detail, it is intended that all matter described above or shown in the accompanying drawings be interpreted as illustrative and not in a limiting sense.

What is claimed is:

1. A spectacle assembly including
a rim having
a V-shaped channel with straight sidewalls intermediate
a pair of flat shoulders,
a lens body mountable in said rim and including
a first face and
a second face, said first and second faces respectively having
first and second peripheral ends, said first and second ends terminating at
a peaked edge, said peaked edge including
a pair of outwardly concave surfaces converging at
a peak intermediate said first and second ends, said outwardly concave surfaces comprising
curved surfaces, each curved surface extending between said peak and the adjacent one of said first and second ends, the angles between a line bisecting the peak and lines tangent to each of the curved surfaces adjacent said ends closely approaching 90°, said channel having
a pair of support edges each at an intersection of the channel with said flat shoulders, said channel being of a width and depth sufficient to receive said peaked edge freely therein, and
said support edges being positioned to contact and support the adjacent one of the curved surfaces of the lens body with said first and second ends and the adjacent portions of the curved surfaces closely adjacent said flat shoulders of said rim and with said peaked edge spaced from the sidewalls and the apex of said V-shaped channel.

2. The spectacle as recited in claim 1 in which the support edges of said rim are relieved.

3. The spectacle as recited in claim 2 in which the support edges are rounded.

4. The spectacle as recited in claim 1 wherein each of said curved surfaces describes an arc of a circle.

5. The spectacle as recited in claim 4 wherein said curved surfaces are arcs of circles having the same radius.

6. The spectacle as recited in claim 1, wherein said arc of each of said curved surfaces is within the range of from 50° to 80°.

7. The spectacle as recited in claim 1, wherein said arc of each of said curved surfaces is within the range of from 60° to 70°.

8. The spectacle lens as recited in claim 1, wherein tangents to each of said curved surfaces at said peaked edge are at an angle of between 25° and 75°.

9. The spectacle as recited in claim 8, wherein said angle between tangents at said peak is between 45° and 55°.

* * * * *